United States Patent [19]

Griffiths

[11] 4,071,339
[45] Jan. 31, 1978

[54] METHOD OF FORMING GLASS FIBERS

[75] Inventor: David H. Griffiths, Allison Park, Pa.

[73] Assignee: PPG Industries, Inc., Pittsburgh, Pa.

[21] Appl. No.: 775,483

[22] Filed: Mar. 8, 1977

[51] Int. Cl.² ............................................. C03B 37/02
[52] U.S. Cl. ....................................... 65/3 R; 65/3 C; 65/11 W
[58] Field of Search ................ 65/3 R, 3 A, 3 B, 3 C, 65/11 W; 118/238

[56] References Cited

U.S. PATENT DOCUMENTS

| | | | |
|---|---|---|---|
| 2,772,518 | 12/1956 | Whitehurst et al. | 65/3 B |
| 3,356,565 | 12/1967 | Smucker et al. | 162/199 |
| 3,378,395 | 4/1968 | Faber | 117/120 |
| 3,494,753 | 2/1970 | Sears | 65/3 R |
| 3,560,178 | 2/1971 | Minkler | 65/3 |
| 3,585,015 | 6/1971 | Hohlfeld et al. | 65/3 |
| 3,820,967 | 6/1974 | Johnson | 65/2 |
| 3,827,397 | 8/1974 | Hebberling | 118/50 |
| 3,844,497 | 10/1974 | Harrill et al. | 65/11 W |
| 3,848,565 | 11/1974 | Schweppe | 118/234 |
| 3,999,970 | 12/1976 | Barch et al. | 65/3 R |

Primary Examiner—Arthur D. Kellogg
Attorney, Agent, or Firm—Alan T. McDonald; John E. Curley

[57] ABSTRACT

A method for producing glass fibers is disclosed. The glass filaments are brought into contact with the surface of an applicator for coating the filaments with a binder and/or size only when production quality strand is being produced. When waste strand is being produced, the filaments are removed from contact with the applicator surface. This substantially reduces binder and/or size consumption and prevents the operator of the forming position from coming into physical contact with binder and/or size coated strand.

15 Claims, 8 Drawing Figures

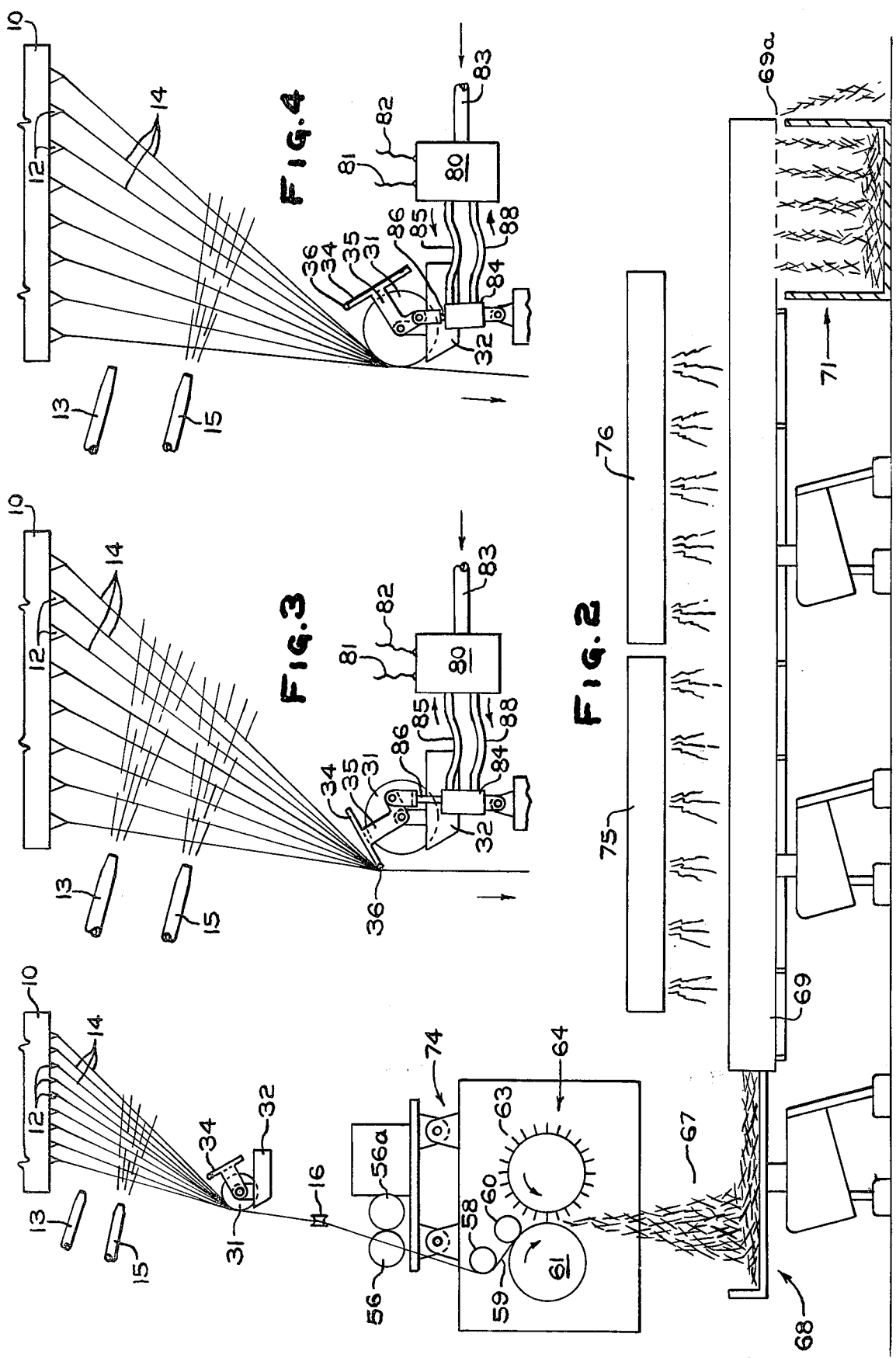

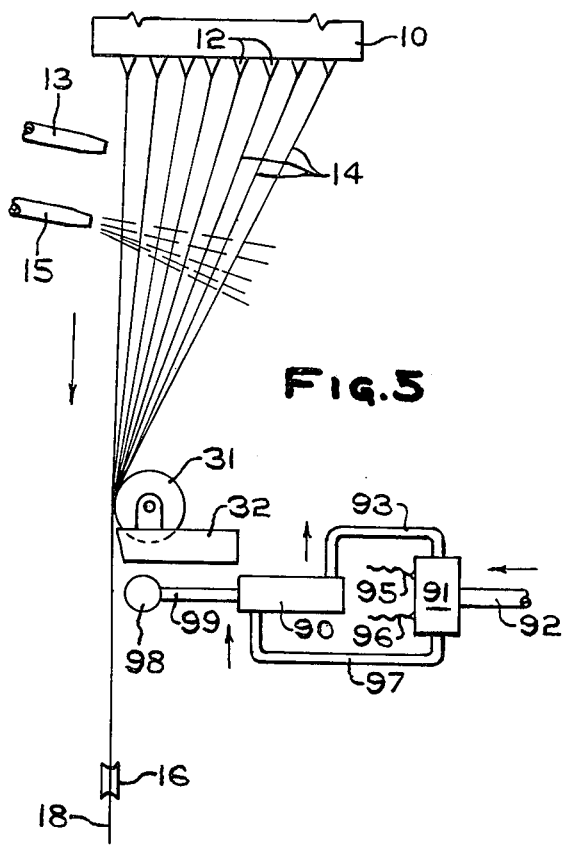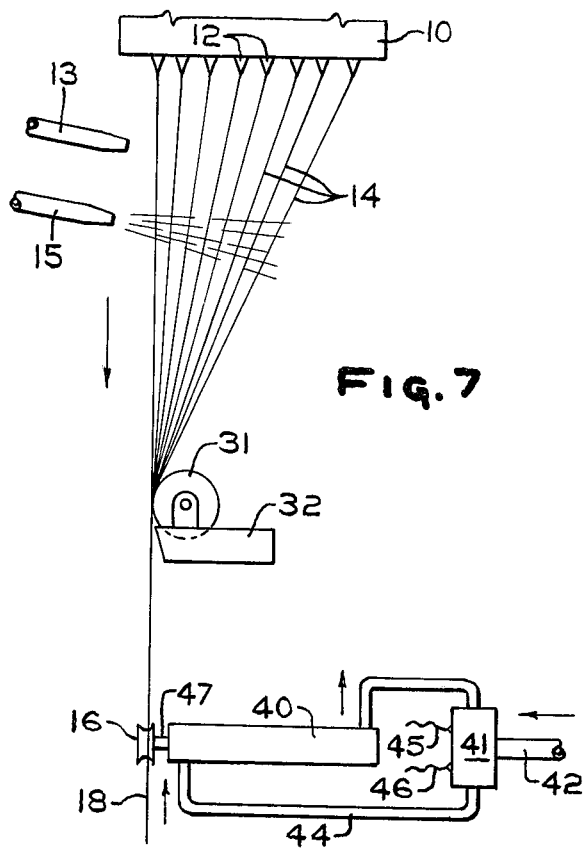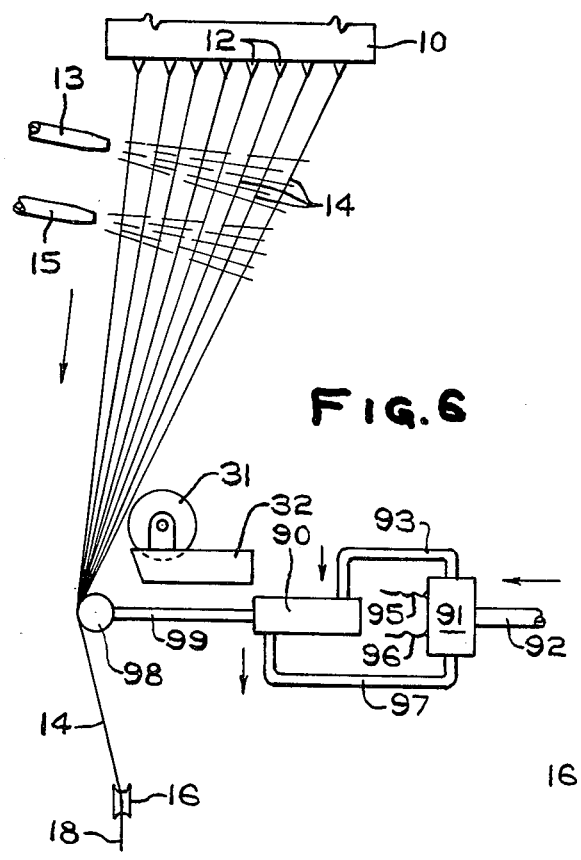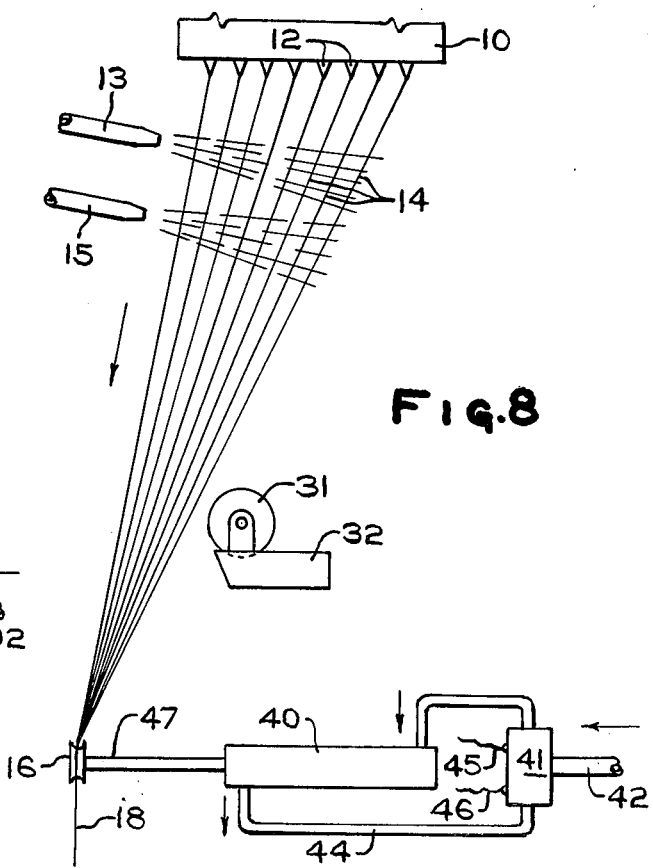

METHOD OF FORMING GLASS FIBERS

BACKGROUND OF THE INVENTION

Glass strand is typically formed by attenuating filaments through orifices or tips at the bottom of a heated bushing containing molten glass. The filaments may be cooled by spraying them with water as they leave the bushing. The filaments are then passed across the application surface of an applicator where they are coated with a binder and/or size. The coated filaments are then gathered into strand form in a gathering shoe which is typically a grooved wheel or cylinder formed of a material such as graphite. The strand may then be traversed across the face of a rotating spiral and wound as a forming package on a rotating collet carried by a winder. Alternatively, the strand from the gathering shoe may be passed between cutting blades and chopped into particulate glass fiber strands. In a further alternative, the strand may be attenuated by an attenuator, such as a belt or wheel attenuator, and collected in a container as a package or passed to a collection surface where the strands are laid down to form a mat product.

In any of the above operations, a significant amount of waste glass fiber strand is produced. In most of the above-described operations inconsistent filament diameter results during start-up and slowdown of the system due to the fact that the filament diameter is inversely related to the speed of attenuation for a given bushing.

Further, such occurrences as low speed attenuation during doffing of the forming package, restarting the strand formation process after a strand breakout, and the like are all examples of instances where the formation of waste strand occurs.

In the past, waste filaments were passed through the forming operation in the same manner as production quality filaments until they had passed the gathering shoe and were formed into strand. Only at this point were they segregated as waste. All of these waste strands and the filaments comprising them were coated with binder and/or size in the same manner as the production quality material. Since the binder and/or size which has been coated onto the waste filaments cannot be recovered, and since waste strand may represent up to about 15 percent of the production of a typical glass fiber forming position or more, it is obvious that the prior art strand formation methods consume a significant amount of binder and/or size which is in actuality being discarded as waste. It is, therefore, desirable to eliminate or substantially reduce the amount of binder and/or size which is wasted by being coated onto waste filaments.

A second problem encountered with the continual coating of filaments with binder and/or size occurs from the necessity of the forming level operator to manually handle the strands during such operations as start-up, and other occurrences of a glass fiber forming operation. To begin the winding of a new forming package on a collet, to begin the chopping of strand, to thread an attenuator, and to restart any of these attenuation devices after a breakout of strand occurs, the operator normally feeds the strand to the operation manually. This requires physical contact between the operator's skin and the coated strand. Some binders and/or sizes may have adverse dermatological effects on an operator's skin from the constant physical contact of the operator's hands with coated strands. It is also desirable, therefore, to reduce substantially or eliminate physical contact between the operator and glass strand having irritating binders and/or sizes coated thereon.

THE PRESENT INVENTION

By means of the present invention, both binder and/or size waste and physical contact between the operator and coated glass strands can be substantially reduced. Generally, the present invention comprises a method of forming glass strands wherein the filaments are removed from contact with the application surface of an applicator during attenuation of waste filaments and their formation into waste strands. This result is accomplished by means not requiring physical contact between the operator and the strand being attenuated.

Specifically, prior to start-up of an attenuation operation or when a strand breakout occurs, the filaments are mechanically moved out of contact with the application surface, coated with a lubricant other than the binder and/or size to be used or being used, attenuated at slow speed by the operator and gathered into strand by a hand-over-hand motion. The strand is placed into the glass fiber attenuating operation, by winding it into a rotating collet, for example, and the speed of the collecting operation is increased until production diameter filaments are being produced. The filaments are then placed in contact with the application surface of the applicator to thereby coat the filaments with the normal binder and/or size, and the resulting strands are collected.

In an operation such as the winding of strands on a collet or the collection of strands in a container, when it is necessary to replace the collector after a completed forming package is produced or a container is filled, the strands are removed from the application surface, attenuated at slow speeds by either allowing the glass to fall by gravity or by placing the strands between a pair of pull rolls to a waste chute. The collector is replaced and the strand is then guided into the attenuator once again. The speed of attenuation is increased until production diameter filaments are produced and the filaments are then contacted with the application surface to thereby coat the filaments with binder and/or size and the resulting strand is collected.

Various apparatus may be employed to remove the filaments from the application surface. Thus, the applicator may be fitted with a movable cover which may extend beyond the surface of the applicator and which may be positioned when desired to direct the strand away from the application surface when production strand is not being produced.

Alternatively, a strand directing means for moving the strand away from the application surface may be provided above or below the applicator.

In a further alternative, the gathering shoe may be provided with means to remove the strand from the application surface.

In another alternative, the applicator itself may be positioned on a track and moved away from the filaments when waste strand is being produced.

In still another alternative, the attenuation device may be positioned on a track and moved along the track to remove the filaments from the application surface when waste strand is being produced.

BRIEF DESCRIPTION OF THE DRAWINGS

The method of the present invention may be more fully appreciated by reference to the accompanying drawings which illustrate specific apparatus which may be utilized to practice the present invention.

FIG. 2 is a side elevational view of a glass fiber forming and chopping operation in which the method of the present invention is employed;

FIG. 3 is an enlarged side elevational view of the applicator 32 of FIG. 2 which is employed in the practice of the invention showing the strand removed from the application surface 31;

FIG. 4 is an enlarged side elevational view of the applicator of FIG. 2 showing the strand in contact with the applicator surface 31;

FIG. 5 is an enlarged, side elevational view of a bar or rod means positioned between the applicator and the gathering shoe in which the filaments are in contact with the application surface;

FIG. 6 is an enlarged, side elevational view of the means of FIG. 5 in which it is positioned to remove the filaments from the application surface;

FIG. 7 is an enlarged, side view illustrating a gathering shoe equipped with means for moving the strand from the application surface where the filaments are in contact with the application surface; and FIG. 8 is an enlarged, side elevational view of the gathering shoe and means of FIG. 7 positioned to remove the filaments from the applicator surface.

DETAILED DESCRIPTION OF THE DRAWINGS

Figure 1:
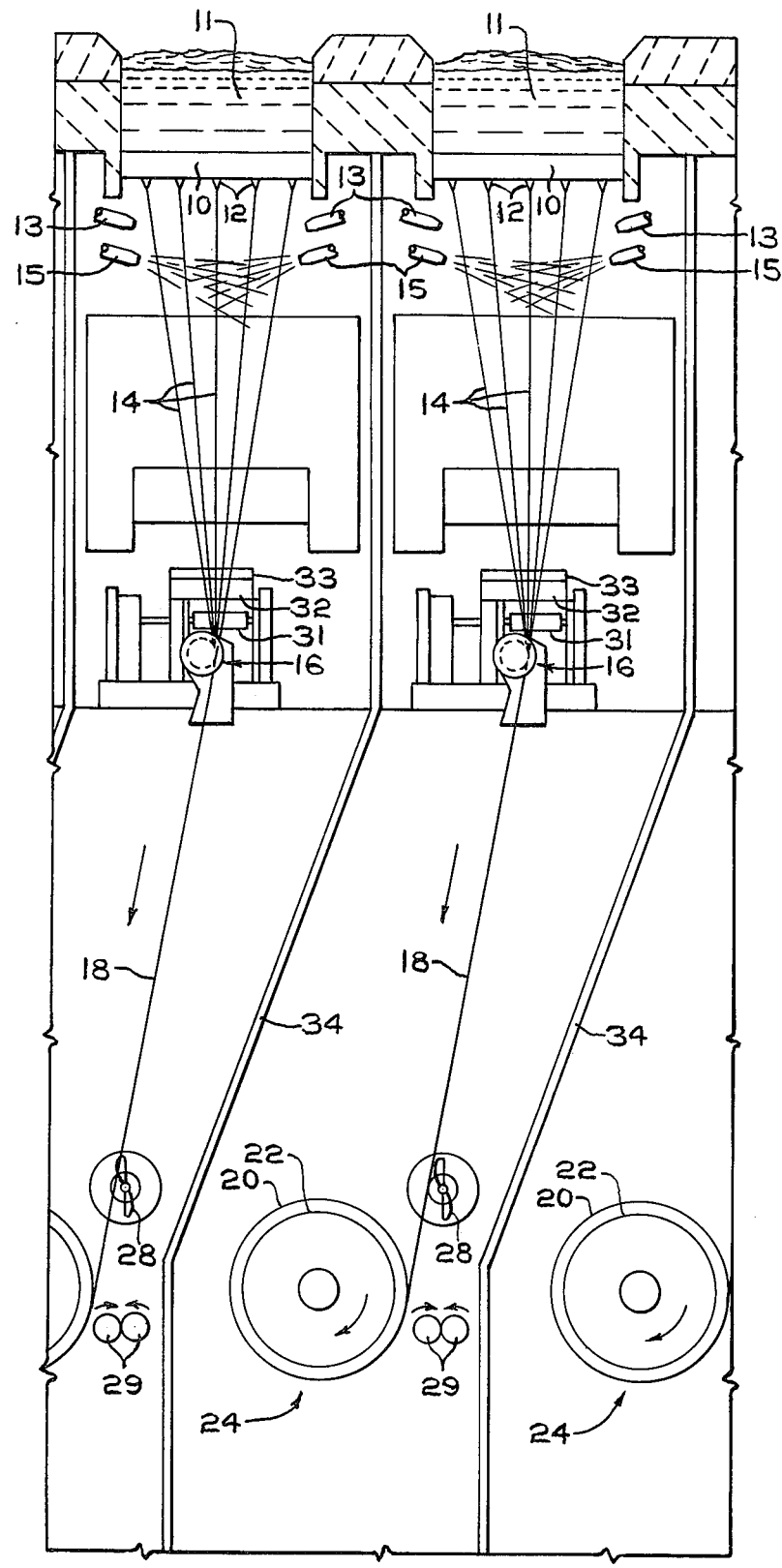
FIG. 1 is a front elevational view of a glass forming and winding operation in which the method of the present invention is employed.

Turning to FIGS. 1 and 2, there is shown glass filaments 14 being attenuated through bushing tips 12 located at the bottom of a heated glass fiber forming bushing 10 containing molten glass 11. The filaments 14 may be sprayed with water by pre-pad spray jets 15 as they leave the bushing to cool them, depending upon the type of filaments being produced. Filaments 14 are then passed across the application surface 31 of an applicator 32 where they are coated with a binder and/or size. This applicator will be more completely described below.

Filaments 14 are then passed into the groove of a gathering shoe 16 which is typically a grooved cylinder or wheel where they are gathered into one or more unified strands 18. The operation of this gathering shoe will be more fully described below.

In FIG. 1, the strand 18 is then traversed across the face of a rotating spiral 28 and collected as a forming package 20 on a rotating collet 22 carried by a winder 24.

In operation, the collet 22 is rotated and collects the strand 18 into a forming package 20 until a desired amount of strand 18 is wound. At this point, the winder is slowed to a stop. When the winder has stopped, the filaments 14 are removed from the application surface 31 of the applicator 32 by any one of the several means to be described below. The strand 18 is passed between a pair of rollers 29 while the operator is removing the forming package 20 from the collet 22 and preparing to wind a new forming package 20.

When the filaments 14 are removed from the application surface 31, they may be sprayed with a lubricant from spray jets 13. If the filaments 14 were being sprayed by the jets 15, the spray from the jets 13 may be in addition to that spray or spray 13 alone may be used. The lubricant from the spray jets 13 may be water alone or may include an additional lubricant material, but is not the binder and/or size which is applied by the applicator 32. Thus, the strand 18 which passes between the rollers 29 and to a waste chute (not shown) is not coated with the binder and/or size, thus substantially reducing binder and/or size comsumption for the operation.

Optionally, instead of the spray jets 13, a stream of the lubricant could be applied to the filaments 14 by flowing the lubricant onto the gathering shoe 16 in sufficient quantities for the filaments 14, such as by means of a trickle tube connected to the source of lubricant, a sprayer, or by any other convenient means.

Suitable lubricants which may be employed are employed in amounts which are sufficient to provide lubricity to the strands, such amounts being about 4 to 15 percent by weight of a water mixture of the lubricant. Typical lubricants are alkyl imidazoline derivatives such as described in U.S. Pat. Nos. 2,200,815; 2,267,965; 2,268,273 and 2,355,837 which are incorporated herein by reference.

Cation X is an example of such a material wherein the alkyl imidazoline derivative is the reaction product of stearic acid, tetraethylene pentamine and acetic acid. Acid solubilized water dispersible stearic amides and anhydrous acid solubilized water dispersible lower molecular weight fatty acid amides as well as anhydrous acid solubilized polyunsaturated lower molecular weight fatty acid amides can also be used as lubricants.

When the operator is ready to begin the formation of a new forming package 20, he wraps the strand 18 around the collet 22 and begins its rotation. When the collet 22 reaches full speed, such that the diameter of the filaments 14 being formed are of a desired production diameter, the filaments 14 are contacted with the application surface 32 and production strand is again produced. When the filaments 14 are in contact with the application surface 31, the spray from sprayer 13 or other lubricant supply is turned off. Thus, the only strand which the operator has come into physical contact with during the doffing operation is strand which was not coated with the binder and/or size.

When a strand breakout occurs, the filaments 14 are again removed from the application surface 32 and the spray jets 13 are activated. The operator then gathers the filaments 14 into a strand and "milks" the filaments from the bushing by pulling them with a hand-over-hand motion at slow speed, placing the strand 18 into the pull rolls 29 when he has gathered all the filaments 14. After changing the forming package 20, he begins the winding of a new forming package in the same manner as after a doffing operation winding the strand at a slow speed and increasing the speed until a production diameter filament is produced at which time the filaments 14 are again contacted with the application surface 32 and are coated with binder and/or size. Thus, the operator is able to handle the strand 18 and correct a strand breakout without coming into contact with the binder and/or size and the waste strand which has been produced after the breakout has occurred and before the breakout can be corrected is not coated with a binder and/or size, thus reducing binder and/or size consumption.

In FIG. 2, a chopping operation for glass strand is illustrated. The filaments 14 are again attenuated through the bushing tips 12 at the bottom of the bushing 10, passed across the application surface 31 of an applicator 32 to be coated with binder and/or size, and gathered by a gathering shoe 16 into one or more unified strands 59.

In this operation, the strands 59 are then passed across a guide roller 58 and between a feed roll 60 and cot roll 61, to provide the attenuative forces necessary to produce the filaments 14. The strands are then passed between a cot roll 61 and a chopper roller 64 having blades 63 protruding therefrom, such that the strands are chopped between the blades 63 and the backup roll 61.

The chopped strands 67 are then passed along a pair of vibratory conveyors 68 and 69, under heaters 75 and 76 and to a container 71, with out-of-size material being discarded at 69a.

This operation is designed to run continuously except for strand breakouts. Should a strand breakout occur, the filaments 14 are removed from the application surface 31, and the sprayers 13 are activated to coat the strands with a lubricant as described above. The operator again gathers the filaments 14 and "milks" them until he has gathered all of the filament 14 and passes them between a pair of rollers 56 and 56a to a waste chute (not shown) prior to restarting the chopper 74. The chopper 74 is then threaded with the strands 59 and brought up to its full speed while isolating the waste chopped strand. When the chopper 74 reaches its full speed, the filaments 14 are again contacted by the application surface 31, coated with the binder and/or size, the spray from nozzle 13 is terminated and the production strand is collected. Once again, binder savings have been accomplished by not coating waste strand with the binder and/or size and the operator has not come into physical contact with strand material having binder and/or size coated thereon.

FIGS. 3 and 4 illustrate one apparatus which may be employed in the method of the present invention. This apparatus is more completely described in concurrently filed U.S. Ser. No. 775,481 filed on Mar. 8, 1977 by Carl A. Melle, which is incorporated herein by reference.

In this apparatus, the filaments 14 which are attenuated through the bushing tips 12 in the bushing 10 are shown in FIG. 4 as they are normally attenuated by an attenuation device, such as a winder, chopper, or attenuator. The filaments 14 may be sprayed with water to cool them by a sprayer 15 and passed across the application surface 31 of an applicator 32. When it is desired to remove the filaments from the application surface 31, such as after a strand breakout, during doffing of a package, and the like, an electric signal is relayed to a solenoid valve 80 through lines 81 and 82. This allows air to pass through the valve 80 from an air inlet 83 and to an air cylinder 84 through line 88. The passage of air through the cylinder 84 forces a piston 86 to be extended. This piston is connected to a pivot arm 35 to which a cover 34 having strand contact surface 36 is attached. Movement of arm 35 forces the cover 34 over the application surface 31 such that the filaments 14 contact the edge 36 of the cover 34 and are moved from the application surface 31. The surface 36 is formed of a material which is not easily damaged by the filaments 14 or which would damage the filaments. Typical materials for this use include graphite or brass.

When it is desired to again contact the filaments 14 with the applicator surface 31, a reversing signal is given to the solenoid valve 80 and air flows from inlet 83 through the valve 80 and to the air cylinder 84 through line 85 to retract the piston 86 and thus move the cover 34 away from the filaments 14 thus allowing the filaments 14 to again contact the application surface 31.

Simultaneously with the activation of the cover 34 to contact the filaments 14, a sprayer 13 is activated to spray water or another lubricant as previously mentioned other than the binder and/or size in the applicator 32 onto the filaments to prevent filament breakouts.

An alternative strand moving means, which is more fully described in concurrently filed U.S. application Ser. No. 775,482 filed on Mar. 8, 1977 by William L. Schaefer and Thomas J. Briar, which is incorporated herein by reference, is illustrated in FIGS. 5 and 6. In these figures, a bar 98 is located between the applicator 32 and the gathering shoe 16. Of course, this bar 98 could be located above the applicator 32. When it is desired to remove the filaments 14 from the application surface 31, an electric signal is given to a solenoid valve 91 through lines 95 and 96. Air flows from intake 92 through the valve 91 and the line 93 to an air cylinder 90. This extends a piston 99 to which the bar 98 is mounted and moves the filaments 14 from the application surface 31. At the same time, sprayer 13 is activated, as in the previous embodiments.

When production diameter filaments are again being formed, a reversing signal is given to valve 91 through lines 95 and 96, the air flow is switched to line 94 and the piston 99 and bar 98 are retracted, as the sprayer 13 is deactivated.

The bar 98 is formed of a material which will not damage the filaments or easily become abraded. Suitable materials for the bar 98 include brass and graphite.

FIGS. 7 and 8 illustrate another apparatus which may be employed in the present method. This apparatus is more fully described in concurrently filed U.S. application Ser. No. 775,659 filed on Mar. 8, 1977 by Herbert W. Barch and August G. Bohy, which is also incorporated herein by reference.

In this apparatus, the filaments 14 are passed across the application surface 31 of the applicator 32 and are gathered by the gathering shoe 16 when production filaments are being collected. When it is desired to remove the filaments 14 from the application surface 31, an electric signal is supplied through lines 45 and 46 to a solenoid valve 41. Air flows from intake 42 through the valve 41, through inlet 43 and extends the piston 47 of an air cylinder 40. The piston 47 is connected to the gathering shoe 16 and positioned such that by extending the piston 46, the filaments passing through the gathering shoe 16 are removed from contact with the application surface 31. As in the previous embodiments, when the filaments 14 are removed from the application surface 31, sprayer 13 is activated to coat the filaments 14 with a lubricant as described above. When it is desired to again coat the filaments 14 with binder and/or size, a reversing signal is given to the air cylinder 40 and air through intake 44 retracts the piston 46 and returns the gathering shoe 16 to its production position.

In each of the above embodiments, the electric signal to the solenoid valve and sprayer 13 may be manually provided, such as by the operator pressing a switch, button or the like. Preferably, however, the signal is automatically provided, such as by linking the signal to the speed of the strand attenuator, to provide a more automatic process. Thus, when the attenuator is at production speed, a signal is given to the solenoid valve to contact the filaments 14 with the application surface 31. When the attenuator slows a signal is given to the valve to remove the filaments 14 from the surface 31.

It is clear that the various pieces of apparatus shown are not the only means by which the method of the present invention can be performed. Other possible ways of accomplishing the same result include positioning either the applicator 32 or the strand collecting means on a track and sliding the applicator 32 away from the filaments 14 or the collection means forward to remove the strand from the applicator. Each of these operations results in the same desired effect, namely, removal of the filaments 14 from the application surface 31 when waste strand is being produced in order to reduce binder consumption and eliminate physical contact by the operator with the binder and/or size coated strands.

From the foregoing, it is obvious that the present invention provides an efficient method for producing glass strands, both in safety and convenience for the operator and in cost savings, based upon reduction of binder consumption.

While the present invention has been described with reference to certain specific embodiments thereof, it is not intended to be so limited thereby, except as set forth in the accompanying claims.

I claim:

1. A method of producing glass fibers comprising attenuating a plurality of filaments from a molten glass source at a slow speed, applying a lubricant other than a binder and/or size to the filaments as they are being slowly attenuated, positioning said strand in an attenuation device, increasing the speed of attenuation until desired filament diameters are obtained, upon attaining the desired filament diameter contacting the filaments with an application surface, applying the binder and/or size to the filaments and stopping the application of said lubricant to the filaments when they are in contact with the application surface.

2. The method of claim 1 further comprising winding said strands as a forming package on a rotating collet.

3. The method of claim 1 further comprising attenuating said filaments into a container.

4. The method of claim 1 further comprising passing said strand between chopping blades and a backup roll and chopping said strands into particulate glass strands and collecting the resulting strands.

5. The method of claim 1 wherein said filaments are continuously sprayed with water during attenuation.

6. A method of restarting a glass fiber forming operation after a breakout in which glass filaments are attenuated through a bushing, the filaments are coated with a binder and/or size, the filaments are gathered into one or more strands and the strands are collected, comprising gathering the filaments, removing the filaments from the application surface of the applicator to thereby avoid coating the filaments with the binder and/or size, attenuating the filaments at slow speed, applying a lubricant other than the binder and/or size to the filaments as they are attenuated at slow speed, positioning the strand into an attenuation device, increasing the speed of attenuation until a desired filament diameter is obtained, contacting the filaments with the application surface to apply the binder and/or size to the filaments while stopping the application of the lubricant other than the binder and/or size to the filaments.

7. The method of claim 6 further comprising winding the strand on a rotating collet.

8. The method of claim 6 further comprising attenuating said strand into a container.

9. The method of claim 6 further comprising passing said strand between cutting blades and a backup roll, chopping said strand into particulate strand, and collecting the resulting strand.

10. The method of claim 6 wherein said filaments are continuously sprayed with water during attenuation.

11. In a method of forming glass fiber strand wherein glass filaments are drawn through a bushing, the filaments are coated with a binder and/or size from an application surface of applicator, the filaments are gathered into one or more strands and the strands are collected, and wherein waste glass fiber strand is being generated the improvement comprising, upon the generation of waste strand, removing the filaments from the application surface of the applicator to thereby avoid coating the filaments with the binder and/or size, attenuating the filaments at low speed, applying a lubricant other than the binder and/or size to the filaments as they are attenuated at slow speed, positioning the strand into an attenuation device, increasing the speed of attenuation until a desired filament diameter is obtained, contacting the filaments with the application surface and stopping the application of the lubricant other than the binder and/or size to the filaments.

12. The method of claim 11 further comprising winding the strand on a rotating collet.

13. The method of claim 11 further comprising attenuating said strand into a container.

14. The method of claim 11 further comprising passing said strand between cutting blades and a backup roll, chopping said strand into particulate strand, and collecting the resulting strand.

15. The method of claim 11 wherein said filaments are continuously sprayed with water during attenuation.

* * * * *